(12) United States Patent
Detwiler

(10) Patent No.: US 7,738,611 B2
(45) Date of Patent: Jun. 15, 2010

(54) REMOTE MONITORING AND CALIBRATION OF SYSTEM REFERENCE CLOCK USING NETWORK TIMING REFERENCE

(75) Inventor: Thomas F. Detwiler, Huntsville, AL (US)

(73) Assignee: Harris Stratex Networks, Inc., Morrisville, NC (US)

( * ) Notice: Subject to any disclaimer, the term of this patent is extended or adjusted under 35 U.S.C. 154(b) by 164 days.

(21) Appl. No.: 11/499,639

(22) Filed: Aug. 7, 2006

(65) Prior Publication Data

US 2008/0032724 A1 Feb. 7, 2008

(51) Int. Cl.
*H04L 7/00* (2006.01)
(52) U.S. Cl. ...................................... 375/354; 370/350
(58) Field of Classification Search ......... 375/354–376; 370/350
See application file for complete search history.

(56) References Cited

U.S. PATENT DOCUMENTS

| | | | | |
|---|---|---|---|---|
| 4,231,114 A * | 10/1980 | Dolikian | | 455/517 |
| 4,494,211 A * | 1/1985 | Schwartz | | 375/356 |
| 5,261,118 A * | 11/1993 | Vanderspool et al. | | 455/503 |
| 5,388,102 A * | 2/1995 | Griffith et al. | | 370/512 |
| 5,404,575 A * | 4/1995 | Lehto | | 455/502 |
| 5,483,201 A | 1/1996 | Bortolini | | |
| 5,499,236 A * | 3/1996 | Giallorenzi et al. | | 370/441 |
| 5,510,797 A * | 4/1996 | Abraham et al. | | 342/352 |
| 5,583,853 A * | 12/1996 | Giallorenzi et al. | | 370/441 |
| 5,697,082 A | 12/1997 | Greer et al. | | |
| 5,722,080 A * | 2/1998 | Kondo | | 455/502 |
| 5,854,793 A * | 12/1998 | Dinkins | | 370/503 |
| 5,870,001 A | 2/1999 | Osterling et al. | | |
| 6,449,290 B1 * | 9/2002 | Willars et al. | | 370/507 |
| 6,452,541 B1 * | 9/2002 | Zhao et al. | | 342/357.06 |
| 6,490,294 B1 * | 12/2002 | Manzado et al. | | 370/465 |
| 6,532,274 B1 * | 3/2003 | Ruffini | | 375/356 |
| 6,564,052 B1 * | 5/2003 | Kawano et al. | | 455/424 |
| 6,577,872 B1 * | 6/2003 | Lundh et al. | | 455/502 |
| 6,665,316 B1 * | 12/2003 | Eidson | | 370/509 |
| 6,731,707 B1 * | 5/2004 | Olofsson et al. | | 375/356 |
| 6,975,655 B2 * | 12/2005 | Fischer et al. | | 370/516 |
| 7,023,942 B1 * | 4/2006 | Roberts et al. | | 375/356 |
| 7,047,011 B1 * | 5/2006 | Wikman | | 455/442 |
| 7,072,432 B2 * | 7/2006 | Belcea | | 375/356 |
| 7,180,412 B2 * | 2/2007 | Bonicatto et al. | | 340/538.11 |
| 7,315,546 B2 * | 1/2008 | Repko et al. | | 370/395.62 |
| 7,356,617 B2 * | 4/2008 | Suzuki et al. | | 709/248 |
| 2001/0046240 A1 * | 11/2001 | Longoni et al. | | 370/503 |
| 2002/0001299 A1 * | 1/2002 | Petch et al. | | 370/350 |
| 2002/0075978 A1 * | 6/2002 | Dick et al. | | 375/356 |
| 2002/0141523 A1 * | 10/2002 | Litwin et al. | | 375/356 |
| 2004/0057543 A1 * | 3/2004 | Huijgen et al. | | 375/356 |
| 2004/0148396 A1 * | 7/2004 | Meyer et al. | | 709/227 |
| 2005/0001688 A1 | 1/2005 | Lin | | |
| 2005/0007993 A1 * | 1/2005 | Chambers et al. | | 370/349 |
| 2005/0013394 A1 * | 1/2005 | Rausch et al. | | 375/356 |

(Continued)

*Primary Examiner*—Temesghen Ghebretinsae
(74) *Attorney, Agent, or Firm*—Sheppard, Mullin, Richter & Hampton LLP

(57) ABSTRACT

A systematic and method for calibrating a local radio reference clock for a radio operating in a radio network having a network reference clock. The method comprises determining at the radio an offset between the local clock and the network clock, placing the local clock in a calibration mode, and calibrating the local clock using a radio link to reduce the offset.

17 Claims, 1 Drawing Sheet

U.S. PATENT DOCUMENTS

| | | | |
|---|---|---|---|
| 2005/0017847 A1* | 1/2005 | Bonicatto et al. | 340/310.01 |
| 2005/0094600 A1* | 5/2005 | Zhang et al. | 370/331 |
| 2005/0147196 A1* | 7/2005 | Quilter et al. | 375/356 |
| 2006/0034407 A1* | 2/2006 | Dick et al. | 375/356 |
| 2006/0050772 A1* | 3/2006 | Shemesh et al. | 375/145 |
| 2006/0062195 A1* | 3/2006 | Gervais et al. | 370/345 |
| 2007/0036077 A1* | 2/2007 | Boggs | 370/230 |
| 2007/0070938 A1* | 3/2007 | Hori et al. | 370/328 |
| 2008/0089437 A1* | 4/2008 | Frederiksen et al. | 375/296 |
| 2010/0002679 A1* | 1/2010 | Zhang et al. | 370/350 |

\* cited by examiner

REMOTE MONITORING AND CALIBRATION OF SYSTEM REFERENCE CLOCK USING NETWORK TIMING REFERENCE

BACKGROUND

Microwave radios must occupy an allocated radio frequency (RF) spectrum and are required to do so using a high-stability reference oscillator. Additionally, in several terrestrial communication systems, user equipment or terminals must acquire and retain time synchronization and frequency synchronization with a central communication node. Thus, it is known that nodes or elements belonging to a radio communications network need to be synchronized with a common time reference. This is particularly important in respect of communications networks that serve mobile telephones, where one and the same time reference must be used between different base stations in order for a user to be able to move without hindrance between the areas covered by base stations during an ongoing communication.

Known solutions to this problem may be found in the use of autonomous clocks or in clocks that are locked to an available navigational system, such as the Global Positioning System (GPS). However, it is not always possible to use GPS, because it may not be possible to receive requisite signals, such as in the case of underground base station installations.

It is also known that oscillators may be controlled automatically with respect to frequency by automatically assigning to the oscillator a correction value in accordance with a given periodicity. Exemplary oscillators that may be controlled automatically are voltage controlled oscillators (VCOs) in which a voltage level determines the frequency of the oscillator. In the case of an oscillator of this kind, it is possible to calibrate and adjust the oscillator periodically and automatically, by controlling the voltage level in question. However, this requires a relevant correction value to be given, i.e., a voltage level that corresponds to the frequency to which the oscillator shall be set.

Oscillators such as VCOs may also be coupled in a phase-locked relationship with a reference signal. For example, when the VCO forms a portion of a PLL circuit, the oscillation frequency of oscillating signals generated by the VCO are locked to that of a reference signal to which the VCO is operably responsive. Many types of radio communication apparatuses utilize VCOs coupled in PLL circuits. For example, a radio base station operable in a cellular communication system is exemplary of a radio communication apparatus which utilizes a VCO coupled in a PLL circuit. Oscillating signals formed by the VCOs are used to form transmit signals which are transmitted by a transmitter apparatus. Additionally, oscillating signals generated by VCOs of receiver apparatuses, for instance, are used in the reception of radio signals. Acceptable frequency stabilities of the oscillating signals generated by the VCOs are required for proper operation of the radio communication apparatus. Acceptable frequency stability of oscillating signals generated by the VCO is required so that downlink signals generated by the radio base station are properly transmitted to a mobile terminal without interfering with other concurrently-transmitted downlink signals. Acceptable levels of frequency stability are similarly required to permit the radio base station to properly receive uplink signals transmitted by mobile terminals to the radio base station.

Thus, while the process of acquiring and retaining synchronization with a central communication node may impose strict requirements on a terminal's frequency standard or clock, a shortcoming of the use of high-precision frequency standards is the associated expense of such oscillators. Furthermore, the problems of transferring a synchronizing reference signal may be divided into two separate groups. First, it may be necessary for an absolute time to be known, i.e., the time of day, and second, a local oscillator may be required to oscillate at the same frequency as a specified reference frequency within a given error tolerance. Embodiments of the present subject matter relate to allowing oscillators active in a network to oscillate at a common frequency.

Network-generated signals, such as a pulse code modulated (PCM) clock signal or a GPS clock signal, may be provided to a communication network. Such signals exhibit good long-term, frequency stability characteristics but are susceptible to short-term, frequency instability. Oscillators, such as an oven-voltage controlled crystal oscillator (OVCXO) or oven controlled crystal oscillator (OCXO) may generate a reference signal which exhibits good short-term frequency stability characteristics but is susceptible to long-term frequency instability due to aging of the crystal oscillator.

Thus, for reasons of cost, autonomous clocks are normally comprised of quartz oscillators. These clocks, however, require periodic manual calibration in order to be able to generate a time reference signal within set requirements. Low cost oscillators such as quartz oscillators have numerous shortcomings including an oscillator's gradual change in frequency over long periods of time. This phenomenon is known as aging. The aging rate of a quartz oscillator is a fundamental limitation in its use in a terminal/central node communication system. Additionally, the performance of quartz oscillators is affected by temperature variation, the range of oscillator frequency as a function of the temperature of the oscillator; retrace, the difference in frequency measured immediately before turn-off and again after turn-on and stabilization; and warm-up, the time measured from initial application of power, required for a crystal oscillator to stabilize its frequency to within specified limits.

Thus, to ensure that the frequency stability standards required of operation of communications networks are met, some networks include reference oscillators which generate reference signals of comparable quality. An OVCXO or OCXO is exemplary of such an oscillator. OVCXO and OCXOs, as well as other oscillators, exhibit short-term frequency stability, but are susceptible to long-term frequency drift caused by aging of the oscillator. Conventionally, such oscillators must be calibrated regularly. Calibration is typically carried out utilizing a manual procedure. Such a procedure is costly, particularly when large numbers of radio base stations of a radio communication system must all be regularly calibrated.

A need has thus arisen for a system and method to provide a means for calibration of a terminal or RF frequency standard. A further need has arisen for a system and method by which the good long-term frequency stability characteristics of a standard provided by a network may be used to correct for the frequency offset of an oscillator positioned at a reference element or site to thereby reduce the need to manually calibrate the oscillator. More generally, a need exists by which to permit a device to be calibrated with a remote reference signal.

Accordingly, it is an object of the present subject matter to obviate many of the deficiencies in the prior art and to provide a novel method of calibrating a local radio reference clock for a radio operating in a radio network having a network reference clock. The method comprises the steps of determining at the radio an offset between the local clock and the network clock, placing the local clock in a calibration mode, and calibrating the local clock using a radio link to reduce the offset.

It is also an object of the present subject matter to provide a novel method of calibrating a local radio reference clock for a radio operating in a radio network having a network reference clock for a synchronous communication protocol. The method comprises calibrating the local radio clock with the network reference clock by communicating information to the radio over a radio communication channel.

These and many other objects and advantages of the present invention will be readily apparent to one skilled in the art to which the invention pertains from a perusal of the claims, the appended drawings, and the following detailed description of the preferred embodiments.

DETAILED DESCRIPTION OF THE FIGURES

Figure 1:
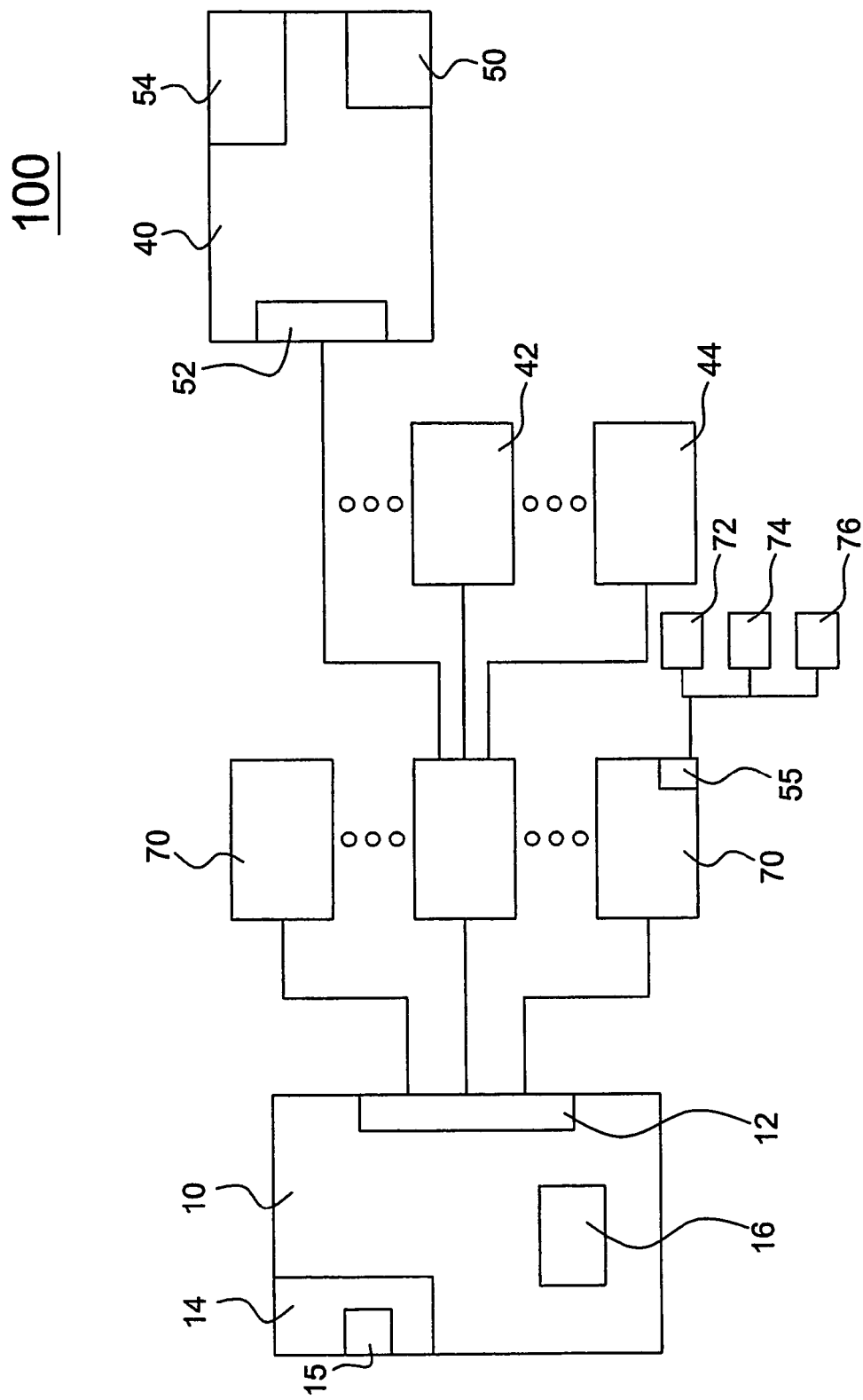
FIG. 1 is a simplified illustration showing a relationship between a main unit and associated elements in a communication system.

With reference to the figure where similar elements have been given similar numerical designations to facilitate an understanding of the present subject matter, the various embodiments of a system and method for calibrating a radio frequency standard are described.

With the intention of solving one or more of the aforesaid technical problems, embodiments of the present subject matter calibrate at least one local radio reference clock with a network reference clock, where the local clock serves a network element, where the network reference clock is included in a main unit also included in the network, and where the frequency of the local clock may be remotely controlled.

The terms clock and oscillator are utilized interchangeably in this document.

A network may be defined as a plurality of nodes, units or elements that mutually interact through some type of communication. This communication may be achieved through electric signals in lines intended for this purpose, optical signals in lines intended for this purpose, or electromagnetic signals via wave-guides or via the free atmosphere.

Certain nodes have also been allocated specific designations in the following description with the intention of enabling the present invention to be understood more easily, wherein a node having a network reference clock for calibration purposes is designated a main unit and wherein nodes that include local clocks to be calibrated with the main unit are designated as elements. Thus, such designations are not intended to limit the scope of the claims appended herewith.

FIG. 1 is a simplified illustration showing a relationship between a main unit and associated elements in a radio communication network. With reference to FIG. 1, a system and method is illustrated for calibrating at least one local radio reference clock or local oscillator 50 belonging to an element 40 of a communications network 100 using a time-generating unit 14 included in a main unit 10 of the network 100.

The local clock 50 may serve an individual element 40, or in an alternative embodiment, a local clock 55 may serve a plurality of elements 70, 72, 74, 76. The network 100 may also include a plurality of other elements 42, 44, which also include local clocks that obtain requisite calibration information from the main unit 10. Elements may be in communication with the main unit 10 via other elements or may be in communication with the main unit 10 directly. It will be understood that the network 100 may also include further elements, although these have not been shown because they have no decisive function with respect to the present subject matter.

With the intention of simplifying the description, only one of the elements will be described in such detail as that required to understand its function in relation to the present subject matter, although it will be understood that further elements that receive calibration information from the main unit are able to do so in accordance with embodiments of the present subject matter. It should also be noted that it is possible for elements to receive calibration information in accordance with other known methods, and there is nothing to prevent the described method and system from being combined with other methods and/or systems for calibrating given elements included in the network.

The time-generating unit 14 in the main unit 10 includes a network reference clock 15 having a reliable reference frequency or standard and which shall be used as a reference for the calibration of at least one local clock 50 present in the network 100. Generally, the stability of the reference clock 15 may be in the ppb or <ppb range. In comparison, local clocks may generally possess stabilities in the ppm range. The reference clock 15 may be any high-stability oscillator known in the art such as an oven controlled crystal oscillator (OCXO), an oven-voltage controlled crystal oscillator (OVCXO). Additionally, the reference clock 15 may be a pulse code modulated (PCM) signal or a signal derived from the global positioning system (GPS). Local clocks may be OCXOs, OVCXOs, VCOs, or other oscillators commonly used in the art. Of course, the aforementioned examples are not meant to limit the scope of the claims appended herewith and embodiments of the present subject matter are other known oscillators in the art.

The element 40 may provide timing and/or frequency information to the main unit 10 via a transceiver unit 52. The element 40 may provide such information periodically, continually, by a remote request initiated at the main unit 10, or upon reaching a predetermined threshold. Such a predetermined threshold may also be indicative of the frequency or timing of the local clock 50 differing from a predetermined setpoint by more than a prescribed amount or level. In a further embodiment of the present subject matter, the information may be representative of a frequency offset of the local clock 50 transmitted from the element 40 to the main unit 10. Upon reaching the predetermined threshold or a predetermined frequency offset, the element 40 may provide an alarm indication to the main unit 10.

In another embodiment of the present subject matter, the main unit 10 may monitor the information and alarm indications of the element 40. Of course, the main unit 10 may periodically monitor such information at predefined time intervals (e.g., msec) or may continually monitor such information. Additionally, the main unit 10 may request such information from the element 40 at predefined time intervals (e.g., msec) or upon receiving an alarm indication from the element 40.

Upon receiving an alarm or other indication from the element 40, the main unit 10 may initiate a calibration of the local clock 50 by providing a command to the element's respective calibration unit 54 via a command unit 16, or the main unit 10 may remotely calibrate the local clock 50 by controlling the tuning voltage of the local clock 50. Of course, calibration of the local clock 50 may be automatic without any personnel intervention. Thus, the frequency of the local clock 50 may be remotely monitored and/or controlled. The main unit 10, in accordance with embodiments of the present subject matter, may further include a transceiver unit 12 adapted to transmit calibration information provided by the command unit 16 to calibrate the local clock 50 and adapted to receive information from the element 40. To ensure that there are no interruptions to active radio traffic, the element or receiver is maintained in a known, coherent state throughout the calibration process. For example, responsive to data provided by the command unit 16, the local clock 50 into a calibration mode to tune the frequency thereof to the network reference. TO ensure that there are no interruptions to radio traffic, phase transitions of the local clock are conducted as slow as necessary such that the mixer of the element or receiver is synchronized in frequency and phase with each phase transition during the calibration process. Thus, the element continues communication with another element(s) or the remote location during the calibration process.

The calibration unit 54 may be adapted to calibrate the local clock 50 with the aid of calibration information provided by the main unit 10. Such calibration information may comprise a request or command from the main unit 10 whereby the calibration unit 54 enters into a calibration mode. In a calibration mode, the local clock 50 may determine or calculate a frequency offset between the reference clock 15 and the local clock 50 and adjust the tuning voltage of the local clock 50 to have a lowest tunable offset. The information may also comprise data from the main unit 10 that directly adjusts the tuning voltage of the local clock 50. The calibrating unit 54 may also be adaptable to utilize a mathematical method for clock calibration, where variations in frequency offset of the local clock 50 may be used in the calibration thereof. For example, the calibrating unit 54 may determine an average of frequency offsets as measured by the main unit 10 over a predefined interval. The average constitutes the difference between the predefined, and therewith expected, frequency and the actual frequency. For example, the main unit 10 may sum n offsets and divide the sum by n. The main unit 10 may then compare the sum divided by n to a predetermined threshold and calibrate the local clock 50 as a function thereof. Of course, the element 40 or local clock 50 may be adaptable to measure, determine, and provide this information to the main unit 10. Thus, such a mathematical method may moderate unnecessary alarms or calibration requests or commands due to noise and spurious signals.

Embodiments of the present subject matter are applicable in networks and systems utilizing synchronous communication protocols such as Synchronous Optical Network (SONET), Synchronous Digital Hierarchy (SDH), T-carrier hierarchies, and E-carrier hierarchies, as well as in other known synchronous communication protocols. The aforementioned communications protocols are exemplary only and are not intended to limit the scope of the claims appended herewith.

It is an aspect of the present subject matter to drive value in a radio communication system. For example, users of embodiments according to the present subject matter may issue maintenance procedures from a centralized location such as a Network Operations Center instead of sending technicians to each site thereby saving labor and associated costs.

In another aspect of the present subject matter having installations without a network reference clock, it is possible to perform a remote calibration or tuning command by injecting a reference clock on a data carrying tributary at a distribution site and claiming it as the calibration reference. Thus, embodiments of the present subject matter may be applied to network installations employing an asynchronous communication protocol.

In an additional aspect of the present subject matter, radio communication between a radio undergoing calibration and other radios in the communication network continues during calibration. In an alternative embodiment, radio communication between the radio undergoing calibration and the main unit having the network reference clock may also continue during calibration.

It is a further aspect of the present subject matter to incorporate a network timing solution with a local RF timing solution within the context of the radio unit.

An exemplary method for calibrating a local radio reference clock for a radio operating in a radio network according to an embodiment of the present subject matter determines at the radio an offset between the local clock and a network reference clock, places the local clock in calibration mode, and calibrates the local clock using a radio link to reduce the offset. Information representative of the offset may be transmitted from the radio to a remote location whereby the remote location may place the local clock in the calibration mode. The offset may be determined as a function of measurements taken by the network reference. The network reference clock may utilize a synchronous communication protocol or in an alternative embodiment, the network reference clock may be replaced by a network reference clock signal injected into a data-carrying communication channel to thereby communicate using an asynchronous communication protocol.

Another exemplary method of calibrating a local radio reference clock for a radio operating in a radio network according to an embodiment of the present subject matter calibrates the local radio clock with a network reference clock by communicating information to the radio over a radio communication channel using a synchronous communication protocol. The information transmitted from the radio may be representative of an offset between the local radio reference clock and the network reference clock. Accordingly, a remote location may place the local clock in a calibration mode as a function of the information. The offset may be determined as a function of measurements taken by the network reference.

As shown by the various configurations and embodiments illustrated in the Figures, a system and method for remote monitoring and calibration of a system reference clock utilizing a network timing reference have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A method of calibrating a local radio reference clock for a radio operating in a radio network, the radio network having a main unit with a network reference clock, comprising the steps of:
   determining an alarm condition triggered when a frequency of the local radio reference clock is different from a predetermined setpoint by more than a prescribed amount;
   transmitting the alarm condition to the main unit;
   determining a frequency offset between the local clock and the network reference clock, based in part on the determination of the alarm condition;
   placing the local clock in a calibration mode; and
   calibrating the local clock by reducing sufficiently slowly the frequency offset between the local clock and the network reference clock to enable continued radio communication with a node during calibration.

2. The method of claim 1 wherein information representative of the frequency offset is transmitted from the radio to the main unit and the main unit places the local clock in the calibration mode.

3. The method of claim 2 wherein the node comprises the main unit.

4. The method of claim 1 wherein the frequency offset is determined as a function of measurements taken by the main unit.

5. The method of claim 1 wherein the network reference clock is a reference clock for a synchronous communication protocol.

6. The method of claim 1 wherein the radio network communicates using an asynchronous communication protocol and the network reference clock is replaced by a network reference clock signal injected into a data-carrying communication channel.

7. The method of claim 4 wherein the measurements are taken at predefined intervals.

8. The method of claim 4 wherein the measurements are taken continuously.

9. The method of claim 2 wherein the information is the alarm condition.

10. The method of claim 1 wherein the step of determining further comprises the steps of:

summing n frequency offsets; and dividing the sum by n.

11. The method of claim 10 wherein the step of determining further comprises comparing the sum divided by n to a predetermined threshold.

12. The method of claim 1 wherein the network reference clock is selected from the group comprising: a Global Positioning System signal, a Pulse Code Modulated signal, a crystal oscillator, an oven controlled crystal oscillator, an oven voltage controlled crystal oscillator, and a voltage controlled oscillator.

13. The method of claim 1 wherein the local oscillator is selected from the group comprising: an oven controlled crystal oscillator and an oven voltage controlled crystal oscillator.

14. The method of claim 1 further comprising communicating information representative of the frequency offset from the main unit to the radio.

15. The method of claim 1 further comprising communicating information representative of the frequency offset from the radio to the main unit and placing the local clock in calibration mode by the main unit.

16. The method of claim 1 wherein the frequency offset is determined as a function of measurements taken by the main unit.

17. A radio network comprising:

a local reference clock in a radio;

a network reference clock remote from the radio;

a component configured to determine an alarm condition triggered when a frequency of the local radio reference clock is different from a predetermined setpoint by more than a prescribed amount and to determine a frequency offset between the local clock and the network reference clock, based in part on the determination of the alarm condition;

a transceiver configured to transmit the alarm condition to a main unit;

a command unit for generating a command to place the radio in a calibration mode; and a calibration unit for calibrating the local reference clock during the calibration mode by reducing the frequency offset sufficiently gradually to enable continued radio communication with a node during calibration.

* * * * *